(12) United States Patent
Dalek et al.

(10) Patent No.: US 11,372,893 B2
(45) Date of Patent: Jun. 28, 2022

(54) ENSEMBLE-BASED DATA CURATION PIPELINE FOR EFFICIENT LABEL PROPAGATION

(71) Applicant: NTT SECURITY CORPORATION, Tokyo (JP)

(72) Inventors: Daniel Dalek, East Palo Alto, CA (US); Himanshu Sinha, East Palo Alto, CA (US); Josefin Axberg, East Palo Alto, CA (US)

(73) Assignee: NTT SECURITY HOLDINGS CORPORATION, Tokyo (JP)

( * ) Notice: Subject to any disclaimer, the term of this patent is extended or adjusted under 35 U.S.C. 154(b) by 411 days.

(21) Appl. No.: 15/996,213

(22) Filed: Jun. 1, 2018

(65) Prior Publication Data
US 2019/0370384 A1 Dec. 5, 2019

(51) Int. Cl.
G06F 16/28 (2019.01)
G07C 13/00 (2006.01)
G06N 20/00 (2019.01)

(52) U.S. Cl.
CPC .......... *G06F 16/285* (2019.01); *G06N 20/00* (2019.01); *G07C 13/00* (2013.01)

(58) Field of Classification Search
CPC ........ G06F 16/285; G06N 20/00; G07C 13/00
USPC ...................................................... 707/737
See application file for complete search history.

(56) References Cited

U.S. PATENT DOCUMENTS

| | | | |
|---|---|---|---|
| 6,575,902 B1 | 6/2003 | Burton | |
| 7,225,343 B1 * | 5/2007 | Honig | G06F 21/554 713/194 |
| 7,912,698 B2 * | 3/2011 | Statnikov | G16B 40/00 704/8 |
| 8,135,718 B1 | 3/2012 | Das et al. | |
| 8,402,543 B1 | 3/2013 | Ranjan et al. | |
| 8,762,298 B1 | 6/2014 | Ranjan et al. | |
| 9,144,389 B2 | 9/2015 | Srinivasan et al. | |
| 9,183,387 B1 | 11/2015 | Altman et al. | |
| 9,674,880 B1 | 6/2017 | Egner et al. | |
| 9,769,189 B2 * | 9/2017 | Mohaisen | H04L 63/1425 |
| 9,787,640 B1 | 10/2017 | Xie et al. | |
| 10,566,084 B2 | 2/2020 | Kataoka | |
| 10,742,669 B2 | 8/2020 | Takahashi et al. | |

(Continued)

FOREIGN PATENT DOCUMENTS

| | | | |
|---|---|---|---|
| JP | 2003242124 A | 8/2003 | |
| JP | 2007318745 A | 12/2007 | |

(Continued)

OTHER PUBLICATIONS

Website Traffic, Statistics and Analytics @ Alexa—Webpage: https://www.alexa.com/siteinfo retrieved from the internet dated Jan. 30, 2018 (5 pages.).

(Continued)

*Primary Examiner* — Robert W Beausoliel, Jr.
*Assistant Examiner* — Arthur Ganger
(74) *Attorney, Agent, or Firm* — Manatt, Phelps & Phillips, LLP

(57) ABSTRACT

A method and architecture allow labeled data to be initialized and curated by the use of label propagation, clustering and creation of dedicated classifiers for each dataset. These dedicated classifiers are retrained as the dataset grows and ensure that each dataset is kept free from outliers and noise.

19 Claims, 16 Drawing Sheets

(56) References Cited

U.S. PATENT DOCUMENTS

| | | | |
|---|---|---|---|
| 2004/0128535 | A1 | 7/2004 | Cheng |
| 2006/0187060 | A1 | 8/2006 | Colby |
| 2007/0078936 | A1 | 4/2007 | Quinlan et al. |
| 2007/0256141 | A1 | 11/2007 | Nakano et al. |
| 2009/0066521 | A1 | 3/2009 | Atlas et al. |
| 2009/0319457 | A1* | 12/2009 | Cheng ............... G06N 20/00 706/46 |
| 2010/0066509 | A1 | 3/2010 | Okuizumi et al. |
| 2010/0286572 | A1 | 11/2010 | Moersdorf et al. |
| 2012/0005755 | A1 | 1/2012 | Kitazawa et al. |
| 2013/0074186 | A1 | 3/2013 | Muttik |
| 2013/0097103 | A1* | 4/2013 | Chari ............... G06N 20/00 706/12 |
| 2013/0195326 | A1 | 8/2013 | Bear et al. |
| 2015/0088791 | A1 | 3/2015 | Lin et al. |
| 2017/0063893 | A1 | 3/2017 | Franc et al. |
| 2017/0251005 | A1 | 8/2017 | Niv |
| 2017/0318033 | A1 | 11/2017 | Holland et al. |
| 2018/0069885 | A1 | 3/2018 | Patterson et al. |
| 2018/0083988 | A1 | 3/2018 | Kataoka et al. |
| 2018/0329958 | A1 | 11/2018 | Choudhury et al. |
| 2019/0132342 | A1* | 5/2019 | Arlitt ............... H04L 61/2053 |
| 2019/0305957 | A1* | 10/2019 | Reddy ............... G06F 21/645 |
| 2020/0358815 | A1 | 12/2020 | Dalek et al. |

FOREIGN PATENT DOCUMENTS

| | | |
|---|---|---|
| JP | 2008049602 A | 3/2018 |
| JP | 2018148267 A | 9/2018 |
| WO | WO2008117544 A | 10/2008 |
| WO | WO2012075336 A1 | 6/2012 |
| WO | WO2018140335 A1 | 8/2018 |
| WO | WO2019032745 A1 | 2/2019 |

OTHER PUBLICATIONS

Kegelman, J.C., et al., entitled "Insights into vehicle trajectories at the handling limits: analyzing open data from race car drivers; Taylor & Francis, Vehicle System Dynamics" dated Nov. 3, 2016 (18 pages.).

Theodosis et al., "Nonlinear Optimization of a Racing Line for an Autonomous Racecar Using Professional Driving Techniques", dated Oct. 2012, 7 pages, Citation and abstract, retrieved from the web at: https://www.researchgate.net/publication/267650184

Tulabandhula, T. et al. "Tire Changes, Fresh Air, and Yellow Flags: Challenges in Predictive Analytics for Professional Racing" MIT, dated Jun. 2014 (17 pages.).

Takagahara, K. et al.: "hitoe"—A Wearable Sensor Developed through Cross-industrial Collaboration, NTT Technical Review, dated Sep. 4, 2014 (5 pages.).

Lee, J.H., et al., Development of a novel Tympanic temperature monitoring system for GT car racing athletes—Abstract Only—pp. 2062-2065, dated 2013 (3 pages.) retrieved from the web at https://link.springer.com/chapter/10.1007/978-3-642-29305-4_541.

Kataoka et al, "Mining Muscle Use Data for Fatigue Reduction in IndyCar," MIT Sloan Sports Analytics Conference (Mar. 4, 2017), pp. 1-12. Retrieved from the Internet. http://www.sloansportsconference.com/wp-content/uploads/2017/02/1622.pdf.

Malik et al. "Automatic training data cleaning for text classification." In: 2011 IEEE 11th international conference on data mining workshops. Dec. 11, 2011 (Dec. 11, 2011) Retrieved on Aug. 2, 2019 (Aug. 2, 2019), entire document, 8 pages. http: //wwwl.cs.columbia.edu/-hhm2104/papers/atdc.pdf.

Chawla et al., "SMOTE: synthetic minority over-sampling technique." In: Journal of artificial intelligence research. Jun. 2, 2002 (Jun. 2, 2002) Retrieved on Aug. 2, 2019 (Aug. 2, 2019), entire document), 37 pages. https://www.jairorg/index.php/jaidarticle/download/10302J24590.

Yen et al., "Cluster-based under-sampling approaches for imbalanced data distributions." In: Expert Systems with Applications. Apr. 2009 (Apr. 2009) Retrieved on Aug. 2, 2019 (Aug. 2, 2019), entire document), 10 pages. http://citeseemist.psu.edu/viewdoc/download?doi=10.1.1.454.35308.rep=rep1&type=pdf.

How to handle Imbalanced Classification Problems in machine learning? In: Analytics Vidhya. Mar. 17, 2017 (Mar. 17, 2017), 46 pages. Retrieved on Aug. 2, 2019 (Aug. 2, 2019), entire document https://www.analyticsvidhya.com/blog/2017/03/imbalanced-classification-problem/.

* cited by examiner

```
@Name(PROXY-D_PCK-126-8-STMT) context CtxCustomerPROXY
select * from pattern [every
b=ProxyEvent(
   cimcompliant,
   outbound,
   extended_features,
   url_flextension = "N/A",
   interaction_count<=10,
   url_filename_length>100,
   urlquerykeycount=4,
   urlqueryparametercount=4,
   maxQueryValueLength>50,
   PROXY_D_PCK_Config.isRig4(url_filename)
)
->
a=ProxyEvent(
   cimcompliant,
   outbound,
   extended_features,
   interaction_count<=10,
   urlquerykeycount=4,
   urlqueryparametercount=4,
   maxQueryValueLength>50,
   PROXY_D_PCK_Config.isExecContentType(http_content_type),
   url_filename_length>100,
   PROXY_D_PCK_Config.isRig4(url_filename),
   src_ip=b.src_ip and url_host=b.url_host) where timer:within(100 seconds)]

isRig4: (/\?[A-Za-z0-9_\&\.=]{100,})
rig keywords: oq,q,biw,fix,que,ct,qturl (exact)
rig params: inquest,educate,daddy,soul,kulture,martery (exact)
```

FIGURE 6

| PITBOSS Dashboard Recent Missions | | |
|---|---|---|
| 2017-07-07-Snail-Detour-malspam-traffic.pcap | 3 observables | 2017-07-07 |
| 2017-07-06-GT-test-tech-support-scam-traffic.pcap | 1 observables | 2017-07-07 |
| 2017-07-05-Japanese-malspam-traffic.pcap | 0 observables | 2017-07-05 |
| 03-July-2017-Magnitude-Cerber-PCAP.pcapng | 0 observables | 2017-07-04 |
| 2017-07-03-Hancitor-malspam-traffic.pcap | 2 observables | 2017-07-04 |
| 2017-06-30-HookAds-Rig-EK-sends-Cerber.pcap | 0 observables | 2017-07-03 |
| 2017-06-29-Hancitor.pcap | 0 observables | 2017-06-29 |
| 2017-06-28-traffic-analysis-exercise.pcap | 0 observables | 2017-06-28 |
| 28-June-Magnitude-Cerber-PCAP.pcapng | 0 observables | 2017-06-28 |
| 2017-06-27-Hancitor-malspam-traffic.pcap | 0 observables | 2017-06-28 |
| 2017-06-26-Hancitor-malspam-traffic.pcap | 0 observables | 2017-06-26 |

FIGURE 8A

```
ScatterGatherConfiguration parametersStep1 = new ScatterGatherConfiguration();
parametersStep1.setDirection(EdgeDirection.OUT);

Graph<String, String, String> resultGraph1 = graph.runScatterGatherIteration(
    new ScatterStep1(), new GatherStep1(), 1, parametersStep1);
```

FIGURE 9A

```
ScatterGatherConfiguration parametersStep2 = new ScatterGatherConfiguration();
parametersStep2.setDirection(EdgeDirection.IN);

Graph<String, String, String> resultGraph2 = resultGraph1.runScatterGatherIteration(
    new ScatterStep2(), new GatherStep2NV(), 1, parametersStep2);
```

FIGURE 9B

```
"kcstate": "EXPLOITATION_DELIVERY_CLIENT",
"of": "UNKNOWN",
"ot": "MALICIOUS",
"pitbossbatchid": "MALWARETRAFFICANALYSIS_2018-04-06-Rig-EK-traffic-1st-run.pcap",
"voteID": "KCc1::MALWARETRAFFICANALYSIS_2018-04-06-Rig-EK-traffic-1st-run.pcap::url_host::46.30.42.150",
"voteSource": "KCc1",
"voteStrength": 27,
"voteTarget": "46.30.42.150",
"voteTargetField": "url_host",
"voteUnderlying": "DBD Activity Template"
```

FIGURE 11

```
urlStruct cluster 27 color: blue
----------------------------------------
2015-04-24-Neutrino-EK-traffic.pcap
2015-07-06-Neutrino-EK-traffic.pcap
2015-07-09-Neutrino-EK-traffic.pcap
2014-12-01-Neutrino-EK-traffic-first-run.pcap
2015-03-31-Neutrino-EK-traffic.pcap
2015-04-24-Neutrino-EK-traffic.pcap
2014-12-01-Neutrino-EK-traffic-second-run.pcap
2015-06-03-Neutrino-EK-traffic.pcap
2014-11-29-Neutrino-EK-traffic-first-run.pcap
2014-12-15-traffic-analysis-exercise.pcap
2015-07-06-Neutrino-EK-traffic.pcap
2014-12-01-Neutrino-EK-traffic-first-run.pcap
2014-12-15-traffic-analysis-exercise.pcap
2015-07-09-Neutrino-EK-traffic.pcap
2015-07-10-Neutrino-EK-traffic.pcap
2014-11-29-Neutrino-EK-traffic-second-run.pcap
2015-04-24-Neutrino-EK-traffic.pcap
2014-12-07-Neutrino-EK-traffic.pcap
2015-06-03-Neutrino-EK-traffic.pcap
2015-01-26-Neutrino-EK-traffic.pcap
```

/flap/97063/sidee/59331/decision/undoubted/boat/50777/sideway/42673/case/12909/bare/6374/
/bear/character/crew/light/unless/quarrel/holiday/58530/higher/70848/hiss/whom/carriage/thief/cold/49 ..
/evil/conduct/click/67221/lighter/64611/treasure/85252/upward/27506/brain/case/survey/whoever/choice/5 ..
/bring/81416/moon/70814/smash/grateful/extend/chin/burst/37343/rube/6975/shine/67111/wreck/17785/
/ride/4599/flap/attacking/mingle/9439/unseen/sign/share/title/beard/4502/alas/society/better/though/five ..
/dormitory/monkey/loose/forth/upper/83734/candle/16584/round/24347/find/2805/short/95447/harm/2461/ex ..
/robot/flight/mistress/72497/lend/warrior/stone/74358/world/everybody/address/that/lack/31266/love/st ..
/blaze/26007/pomt/88413/lift/1812/misty/41088/earn/22809/wail/4460/monster/21161/about/64040/unexpect ..
/alive/29654/earnest/36753/chin/52122/a-ise/96261/fevew/81853/sometime/92179/alien/49927/profession/43 ..
/outer/51936/sake/listen/delight/announce/scholar/offer/chatter/hungry/manner/dimension/pursuit/4915/
/beard/bread/worry/75565/slice/seven/head/27431/drug/44515/brow/70866/farewell/82958/faster/74763/boi ..
/advance/36/tuck/72714/museum/97859/confusion/apart/distress/33507/knot/16830/truth/rush/apple/47614/
/flow/17610/avenue/67788/source/45828/total/7782/misery/swirl/some/29364/patience/interval/ford/setti ..
/gaze/9501/song/survive/knock/23742/value/48541/armor/47594/nanny/1348/alarm/2483/hover/45988/
/clever/10855/worth/43825/tread/7294/model/58526/swift/9733/dick/6809/born/16415/
/shape/worse/steady/83510/separate/93797/amaze/66671/utter/61788/suppress/52966/establish/33105/dispo ..
/control/74279/tidings/42922/even/52895/distract/already/cheerful/77883/poke/brief/handle/57755/
/patch/sacrifice/play/attitude/christmas/radio/second/75392/risk/92839/with/39798/anymore/33018/
/plant/8077/tree/42800/heir/here/king/village/pain/waist/defeat/81667/mind/60009/discussion/17232/
/steam/slap/traffic/31745/work/2955/steeple/cause/deny/underground/ride/59155/limp/57845/occupy/2146/ ..
/down/37050/furious/highest/splash/moonlight/connect/thirteen/short/goodness/fortunate/16523/arrive/4 ..

FIGURE 12B

ENSEMBLE-BASED DATA CURATION PIPELINE FOR EFFICIENT LABEL PROPAGATION

FIELD

The disclosure relates generally to machine learning and in particular to expanding labeled datasets used for supervised machine learning.

BACKGROUND

Today, there are many known and yet to be discovered applications for machine learning and supervised machine learning in which a computer is able to "learn" about a topic, such as malware detection, and then be able to perform malware detection. However, supervised machine learning requires access to a balanced and accurate labeled dataset to work properly. The impact of poorly labeled dataset has been studied in works such as "Automatic Training Data Cleaning for Text Classification, Hassan H. Malik, Vikas S. Bhardwaj". FIG. 10 shows how the accuracy of a Random Forest classifier degrades with the number of mislabeled entries in the Iris dataset.

Creation of these labeled datasets is often error-prone and time-consuming, which is why there is a major shortage of labeled datasets despite access to large amounts of data. Typically, the available datasets have a minority class of interest with few (often noisy) samples and a large amount of majority class entries.

It is desirable to be able to generate these labeled datasets and expand the dataset using label propagation. Previous practical research in this area has focused on noise sensitivity, i.e. making sure that the classifiers are able to perform reasonably well in the presence of noise. The research in data curation has focused more on the threats of the curation process itself where data loss or errors may be introduced while transforming the data. In existing research, the primary driver for curation is from preservation needs rather than label consistency and accuracy.

Some examples of existing techniques include the manual validation and correction of the labels in the dataset. This approach is very error prone since it involves human validation and time consuming since the datasets are large. Other techniques manually validate and correct the labels of test dataset only. This approach is less time consuming but makes it impossible to determine how much of the model performance is affected by mislabeled data.

Another current technique identifies and remove outliers in the dataset that may be mislabeled instances but does not completely address the accuracy and consistency problems of the labels. Other techniques use machine learning algorithms which gracefully degrade with increased noise levels, but also do not solve the label accuracy and consistency problem.

Thus, a technical problem exists with known and existing systems and methods that propagate labels and generate labeled datasets since these labeled datasets are not accurate and consistent. Thus, it is desirable to provide a system and method for label propagation that addresses the label accuracy and consistency problems and provides a technical solution to this technical problem and it is to this end that the disclosure is directed.

BRIEF DESCRIPTION OF THE DRAWINGS

FIG. 6 illustrates an example of a rule that the SIEM classifier uses to detect a RIG_EK variant;

FIGS. 8A-8D illustrates examples of certain user interface screens of the label propagation system and method;

FIGS. 9A and 9B illustrates pseudocode that may implement parts of the label propagation system and method;

FIG. 11 illustrates an example vote for a classifier;

FIG. 12B illustrates the NEUTRINO_EK cluster example.

DETAILED DESCRIPTION OF ONE OR MORE EMBODIMENTS

The disclosure is particularly applicable to a label propagation system having the elements disclosed below for use in malware detection and it is in this context that the disclosure will be described. It will be appreciated, however, that the system and method has greater utility since the label propagation system may be used for various types of datasets and is not limited to the malware example discussed below and the label propagation system and method may be implemented differently than disclosed below and those other implementations are within the scope of the disclosure.

The disclosed system and method provides a technical solution to the above described technical problem with label accuracy and consistency for supervised machine learning by significantly automating the labeling process and ensuring that the data is kept curated as the labeled dataset is extended. The dataset features used by the system and the curated dataset itself can then be used for prediction by any platform which has supervised Machine Learning training capabilities. Thus, the disclosed system and method produces datasets with accurate and consistent labels that may then be used as the datasets for any known supervised machine learning including yet to be developed supervised machine learning that can take advantage of the accurate and consistent labeled dataset generated by the disclosed system and method.

Figure 1:
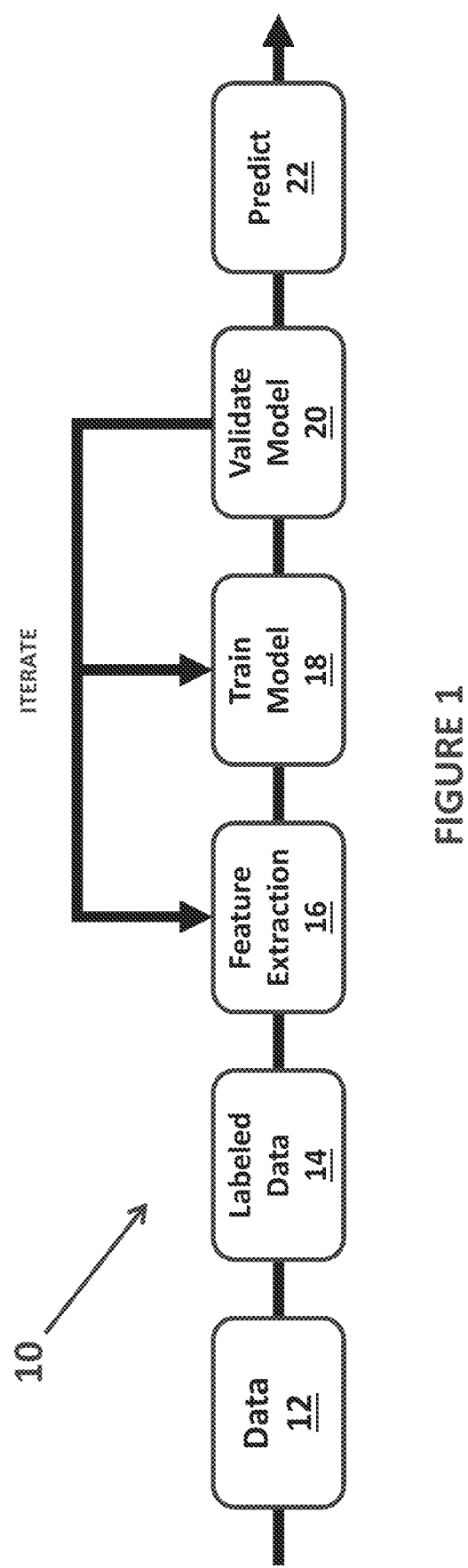
FIG. 1 illustrates a typical supervised machine learning process.

FIG. 1 illustrates a typical supervised machine learning process 10 that has the technical problem with inaccurate or inconsistent labeled data sets and this supervised machine learning that may take advantage of the label propagation and the labeled dataset generated by the label propagation system as described below. The supervised machine learning machine process 10 may include a data acquisition process 12, a data labeling process 14, a feature extraction process 16, a model training process 18, a model validation process 20 and a prediction process 22. As shown in FIG. 1, the feature extraction process 16, the model training process 18 and the model validation process 20 may be iterated. The data acquisition process 12 may gather raw data, such as one or more datasets, that may have multiple classes. The data labeling process 14 is the process that is being improved by the below described label propagation system. The data labeling process 14 may include the processes of identifying the classes and attribute noise that may impact separation of the classes. The data labeling process 14 may also include identifying class imbalance issues and possible steps for addressing these, including under-sampling the majority class, over-sampling the minority class, or by creating synthetic samples using techniques such as SMOTE (N. V. Chawla, K. W. Bowyer, L. O. Hall and W. P. Kegelmeyer (2002) "SMOTE: Synthetic Minority Over-sampling Technique"). As described above, this labeling process may be performed with known techniques, but those known techniques have the technical problems of inaccurate and/or inconsistent labels that adversely affect the supervised machine learning. In contrast, the label propagation process and system described below provides a technical solution to the above problem and provides accurate and consistent labeled datasets that enhance the supervised machine learning process. As seen in FIG. 1, a majority of the supervised machine learning process relies on the labeled data process 14 so that inaccurate or inconsistent labeled data is a significant technical problem for supervised machine learning.

The supervised machine learning may perform and iterate over the feature extraction (domain specific) 16, the model training 18 and the model validation 20 that all rely on the labeled data so that labeled data (and its accuracy and consistency) is a very important factor in the quality of the supervised machine learning process. The model training 18 may involve various machine learning algorithms, such as for example, Random Forest, AdaBoost, SVM and Logistic Regression. During the model validation 20, the process may cross validate the data sets.

Once the machine learning model has been trained and validated, the model may be used for predictions with a confidence threshold. This can be done using any available machine learning library, such as scikit-learn (http://scikit-learn.org), SMILE (https://haifengl.github.io/smile/) or tensorflow (https://www.tensorflow.org/).

Figure 10:
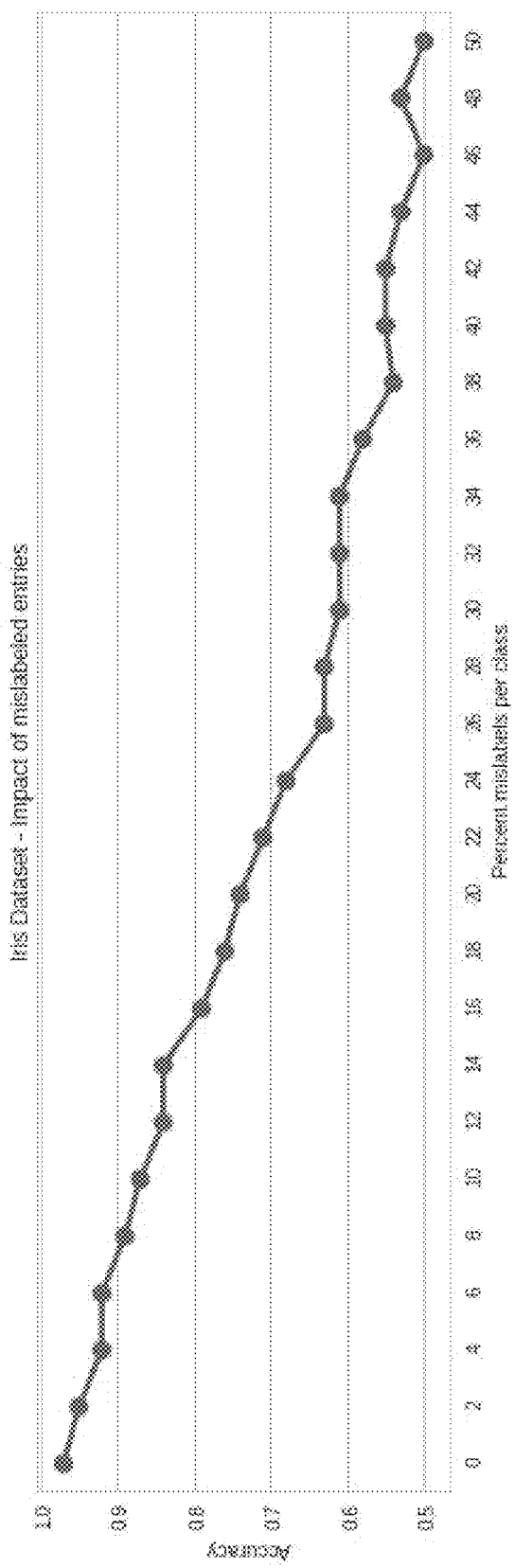
FIG. 10 illustrates how the accuracy of a Random Forest classifier degrades with the number of mislabeled entries in the Iris dataset.

Thus, the trained and validated model (based on the accuracy and consistency of the labeled data) performs best when training with accurate and consistent labeled data. FIG. 10 shows how the accuracy of a classifier degrades with the number of mislabeled entries.

Figure 2:
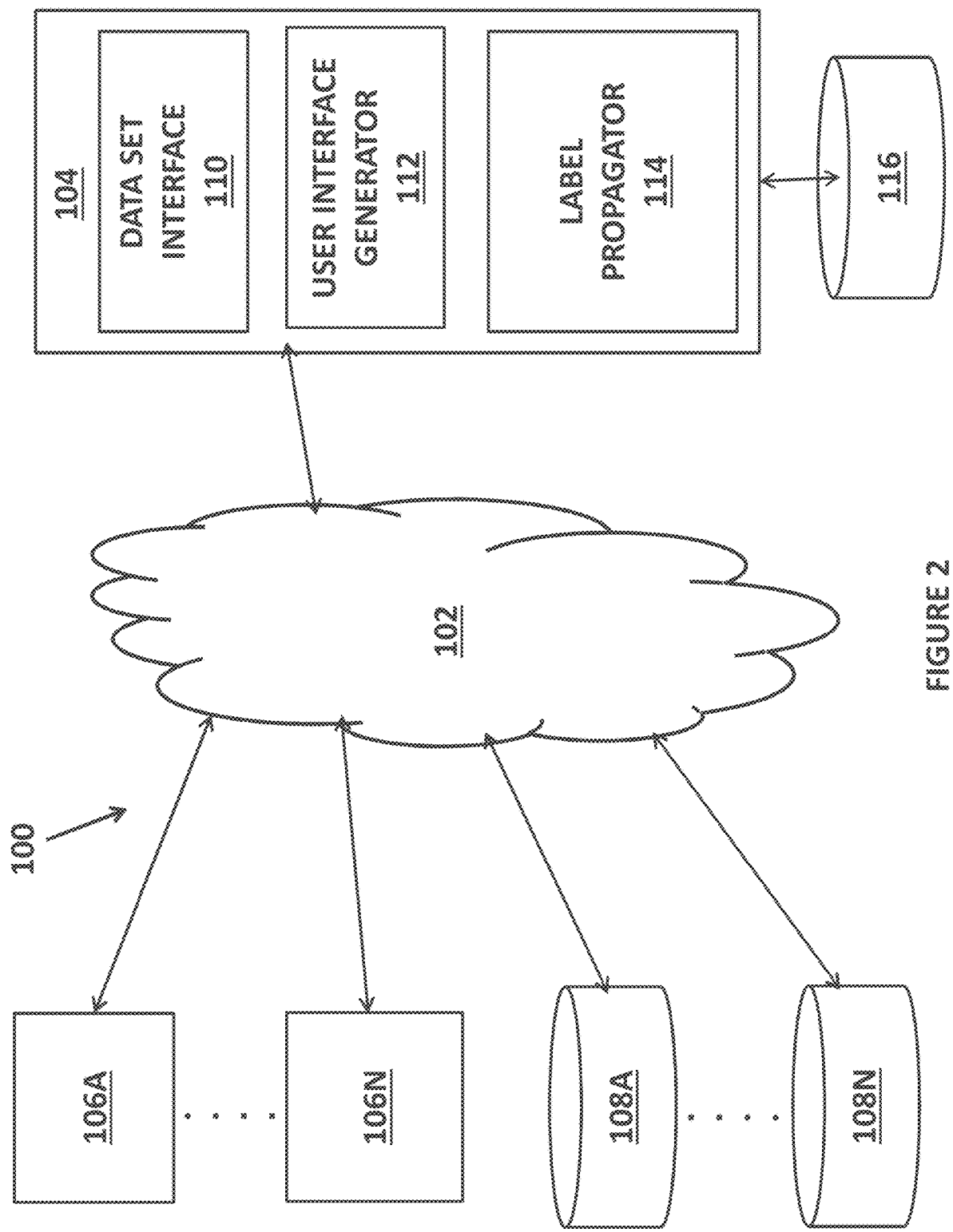
FIG. 2 illustrates an example of a computer system architecture that may host a label propagation system.

FIG. 2 illustrates an example of a computer system architecture 100 that may host a label propagation system. The system 100 may have one or more front end elements that are connected over a communications path 102 to a backend element 104 that perform the dataset label propagation as described below. The frontend elements may include on or more computing devices 106 (such as computing device 106A, . . . , 106N shown in FIG. 2) that can couple to the communication path 102 and communicate with the backend 104 wherein each computing device 106 allows each user to interact with the backend and its processes as described below. Each computing device 106 may have at least one processor, a memory, persistent storage, a display and connectivity circuits so that the computing device 106 may connect to, communicate with and exchange data with the backend 104. In one embodiment, each computing device 106 may store and execute (using the processor of the computing device) a known or yet to be developed browser application, a mobile application or another application that facilitates the exchange of data and communications with the backend 104. The frontend elements may also include one or more datasets sources 108 (such as dataset 108A, . . . , dataset 108N in FIG. 2), such as a database or other data storage device or mechanism wherein the backend 104 may have an interface that receives the data from the dataset in order to propagate the labels for the received dataset as described below in more detail. For example, in one illustrative example, the dataset may be a malware dataset.

The communication path 102 may be path that allows data to be communicated between the front elements and the backend 104. The path may be one or more wireless communications paths, one or more wired communication paths or a combination of one or more wireless communication paths and one or more wired communication paths. For example, the one or more wireless communication paths may be a cellular network, a WiFi Network, a digital data network, etc. and the wired communication path may be the Internet, Ethernet, etc. The communication path 102 may utilize various protocols including communication protocols and data transfer formats. For example, TCP/IP, HTTPS or HTTP, JSON, HTML, etc may be used.

The backend 104 may include a data set interface 110 that receives the dataset for which a plurality of labels is going to be propagated using the label propagation process. In one embodiment this interface is REST-based and uses a JSON format for messaging.

The backend 104 also may include a user interface generator 112 that generates the user interface for the label propagation system and process as described below for each computing device 106. For example, the user interface generator 112 may generate the user interface to gather data from each computing device 106 and may display data resulting from the label propagation process to each computing device 106. The backend 104 also may include a label propagator 114 that receives the incoming data set and performs the unconventional and atypical label propagation process to expand the number of accurate and consistent labels for the dataset (to provide the technical solution to the above technical problem of inaccurate or inconsistent labeled data sets) that may then be used by any supervised machine learning process and improve that supervised machine learning process.

The backend 104 and each of its elements shown in FIG. 2 may be implemented is hardware, software and/or a combination of hardware and software. When an element is implemented in hardware, the element may be an integrated circuit, an ASIC, a state machine and the like that is designed/programmed to perform the unconventional, non-standard processes of that element as described below. When an element is implemented in software, the element may be a plurality of lines of computer code that may be executed by a processor of the backend 104 so that the processor is configured to perform the unconventional, non-standard processes of that element as described below. The backend 104 may be implemented using one or more computing resources and may include at least one processor, memory, etc. and may be implemented using a server computer or a blade server and the like.

In one embodiment, the hardware of the computer system architecture may be any hardware (at least one processor, memory, storage, etc.) that supports or executes an operating system which can run a Java Virtual Machine (JVM). The user interface (UI) generated and used by the system is web-based where any modern browser can be utilized (e.g., Chrome, Safari, Firefox, Internet Explorer (IE), etc.) on the client side, while the UI backend has a dependency on being able to run Python code. The backend may have a software stack that may include, for example, Apache Flink/Gelly (further details of which may be found at //flink.apache.org/ that is incorporated herein by reference) and MongoDB (further details of which may be found at www.mongodb.com/ that is incorporated herein by reference), but may also use RethinkDB (further details of which may be found at www.rethinkdb.com/ that is incorporated herein by reference). Furthermore, AngularJS may be used for UI development of the frontend/client and pymongo may be used for the backend.

The label propagator 114 implements a method and architecture that allows labeled data to be initialized and curated by the use of label propagation, clustering and creation of dedicated classifiers for each dataset. These dedicated classifiers are retrained as the dataset grows and ensure that each dataset is kept free from outliers and noise. The method involves receiving a set of data; performing a plurality of classification processes on the set of data to automatically identify, by each classification process, a label group in the set of data; voting to determine a selected label group for the set of data based on the label group in the set of data identified by each of the plurality of classification processes; generating a curated labeled dataset, the curated labeled dataset including the set of data and the selected label group; and building a classifier from the curated dataset which acts as a gatekeeper for extending the curated dataset.

The label propagator 114 may be implemented as a system, comprising a specially configured computer system having a processor, a memory and an interface that receives a set of data; one or more bootstrap classifiers executed by the computer system that processes the set of data to identify a label group in the set of data; a clusterer executed by the computer system that processes the set of data to automatically identify a label group in the set of data; the computer system being further configured to: vote to determine a selected label group for the set of data based on the label group in the set of data identified by each of the classifiers and the clusterer; and generate curated labeled dataset, the curated labeled dataset including the set of data and the selected label group. This curated labeled data is then used to generate a dedicated classifier for the dataset which is then used in further voting iterations. When new data is received the process is reiterated where the voting weight of the dedicated classifier is increased as the dataset grows.

The data set interface 110 (that may be known as a data input layer) is a hardware or software interface that is specially configured to receive datasets and data samples of the data sets and separate the data samples into one or more classes, such as a minority class that is the class of data on which prediction is going to be performed and the majority class. The majority class samples are typically available in large numbers since the purpose of this class is to represent all samples that do not belong to the minority class. An exemplary and illustrative dataset that may be used by the system is shown in Table A1.1 below where 1 RIG infection is present in a URL access log over 24 hours. The full URL access log consists of over 2 million URL requests while the RIG interaction has triggered 3 individual requests in this dataset.

TABLE A1.1

URL access log containing RIG infections

| Method | Content Type | Status | URL | Class |
|---|---|---|---|---|
| GET | text/html | 200 | hxxp://www.google.com | Majority-not RIG_EK |
| GET | text/html | 200 | hxxp://www.bing.com/?toWww=1&redig=8C7C0FA6E21F46E3AAA733B395BB1D01 | Majority-not RIG_EK |
| GET | text/html | 403 | hxxp://mb9eo-ye9fz.ads.tremorhub.com/ad/tag?adCode=mb9eo-azs0x&playerWidth=400&playerHeight=300&srcPageUrl=http://www.thehindu.com/entertainment/movies/this-weekend-at-the-movies/article22436802.ece?homepage=true&fmt=json | Majority-not RIG_EK |
| GET | application/x-apple-plist | 200 | hxxp://swcatalog.apple.com/content/catalogs/others/index-windows-1.sucatalog | Majority-not RIG_EK |
| GET | text/xml | 200 | hxxp://weather.service.msn.com/data.aspx?wealocations=wc%3aSWXX0028&culture=en-US&weadegreetype=C&src=outlook | Majority-not RIG_EK |
| GET | test/javascript | 200 | hxxp://quote.morningstar.com/quoteservice/sq.ashx?ticker=IXUS:COMP | Majority-not RIG_EK |
| HEAD | text/html | 403 | http://tlu.dl.delivery.mp.microsoft.com/filestreamingservice/files/0bdc691f-ed2c-44ca-a34c-8cad621d5c7a?P1=1514875219&P2=301&P3=2&P4=Jn5JePsa98fDipxlieP2qtqnInABNM0SUdm8C4A1jy0%3d | Majority-not RIG_EK |
| GET | image/png | 200 | http://maps.googleapis.com/maps/api/js/StaticMapService.GetMapImage?1m2&1i2894095&2i6719041&2e1&3u16&4m2&1u625&2u468&5m5&1e0&5sen-US&6sus&10b1&12b1&token=97698 | Majority-not RIG_EK |
| . . . | . . . | . . . | . . . | Majority-not RIG_EK |
| POST | application/x-www-form-urlencoded | 200 | hxxp://46.30.42[.]150/?NTIxNDkw&KYsKHj&VioIrsyWmu=bWlsaw==&MXKMzeiCirZ=...zURnLwtASVVFmRrbM&t45casdva3d=dKLtSNQXkjRCIeQZln9gLVllBpKqojEDcyxOflpbW_hPYNFlGqpXGR7UL6G2xzPNRcw&bYeATmOBEgaBtvc=dGhpbmdz | Minority-RIG_EK |

TABLE A1.1-continued

URL access log containing RIG infections

| Method | Content Type | Status | URL | Class |
|---|---|---|---|---|
| GET | application/x-shockwave-flash | 200 | hxxp://46.30.42[.]150/?MTc5Mzk4&BpJmrDLfA&t45casdva3d=9_clK7IFNQHljkbWLQYzz41YUFsa9ar4j0eBz0PJ08KF-UbeUQ5E_JOTEIF4nwvF&sncUhRO=bG9jYXRlZA==&xAVYqSp=dGhpbmdz&fdxsdxcv3s=wXrQMvXcJwDQCYbGMvrESLtBNknQA0KK2Ir2_dqyEoH9fmnihNzUSkrw6B2aCm3Y&vbNKiUdvXXDOMbH=cmVwb3J0&1TyutKXjYUY1Zw=Y29uc2lkZXI=&aWNdrKbUzNWhLR=bG9jYXRlZA==&groRpyPkxakTMfp=cmVwb3J0&gftEUD=Y2FwaXRhbA== | Minority-RIG_EK |
| GET | application/x-msdownload | 200 | hxxp://46.30.42[.]150/?NTIyNzM4&PWqPodhVBUO&MJdbaFQiMZ=cG9wdWxhcg==&yMSsxnCeDMdH=bG9jYXRlZA==&jHqkZeHnt=cmVwb3J0&YOLnHSCgPZrM=bG9jYXRlZA==&XxlXrpMv1T=dW5rbm93bg==&t45casdva3d=no1VVFkToqqmjETRyhLK1pGBrxbeYgxH_pacFrI4jln0m7ISJc5ylBDX7mQDn-4tWlwR5w4Smqj7S6SJrkZA&PdVhpi=bG9jYXR1ZA==&fdxsdxcv3s=xHrQMrfYbRvFFYffKP7EUKNEMUzWA0OKwYqZhavVF5qxFDXGpbX1FxjspVidCFmEmvZvdLYHIweh1UDASwNo&VasOxoprsFPeoTg=dGFraW5n | Minority-RIG_EK |

If each URL request is treated as input data to a binary classifier, this dataset would be unbalanced at a ratio of 2000000 to 3 since all non-RIG entries belongs to the majority class. A significant increase in the amount of RIG samples is necessary before pursuing a supervised machine learning approach.

The system and method performance may be increased by adding a significant amount of majority class samples, described further below when using a Diverse Resistance undersampling method to balance the training data. Note that an unbalanced data input and binary classification scenario is just a common special case and the approach will work equally well for balanced datasets and multi-label classification.

Figure 3:
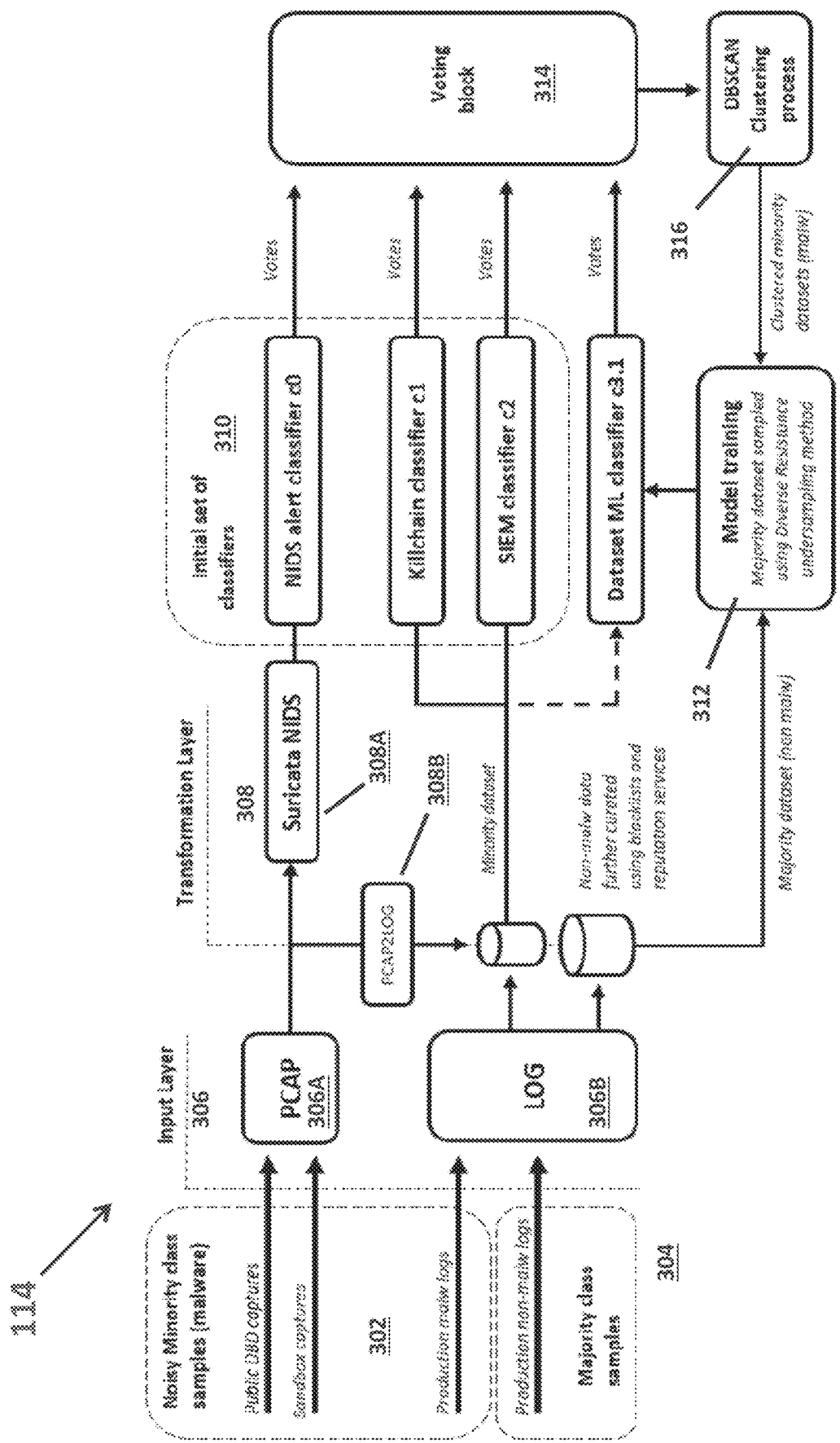
FIG. 3 illustrates more details of the label propagation element of the label propagation system being used for noisy samples of malicious network traffic being categorized into malware family labels.

FIG. 3 illustrates more details of the label propagation element 114 of the label propagation system that perform the unconventional and non-generic label propagation process that is part of the inventive concept of the label propagation system being used for noisy samples of malicious network traffic being categorized into malware family labels. In one embodiment, each of the elements of the label propagation element 114 in FIG. 3 may be implemented as a plurality of lines of computer code/instructions that may each be executed by a processor so that the processor is specially configured to perform the unconventional label propagation processes. Alternatively, each of the elements may be implemented using a specially configured hardware device (ASIC, integrated circuit, DSP, state machine, microcontroller, microprocessor, etc.) that is configured to perform the unconventional label propagation processes.

As shown in FIG. 3, the label propagation element 114 may receive, as input, minority class samples 302 and majority class samples 304. In an exemplary embodiment, the minority class samples may be noisy malware data (thus necessitating label propagation and clustering to separate the labels) and the majority class samples may be non-malware logs when the label propagation system is being used with a malware detection system. However, the label propagation system may be used with any type of data in which it is desirable to have clean labels so that the system and method are not limited to the malware example used in this disclosure. In the malware example shown in FIG. 3, the minority class samples may include public drive by download (DBD) captures and sandbox captures of the minority class samples, examples of which were described above. These minority samples may be input using known packet capture techniques (PCAP) 306A. The minority class samples 302 may also include production malware logs. In the example in FIG. 3, the majority class samples 304 may be production non-malware logs since the intent of this class is to act as the opposite class of the minority class (malware family) which we are attempting to predict. The majority class samples may be input, with the production malware logs into a known logging technique 306B. Note that the PCAP and LOG 306A, 306B may be part of the data set interface 110 shown in FIG. 2 or an input layer as shown in FIG. 3. Thus, the format of the network data samples (for the malware example) may be presented to the system in one of two formats: PCAP and LOG. The PCAP format is a de facto binary format for capturing network data and the LOG format is similar but contains limited application level details. Input data is obtained from numerous sources as shown in FIG. 3.

Figure 4:
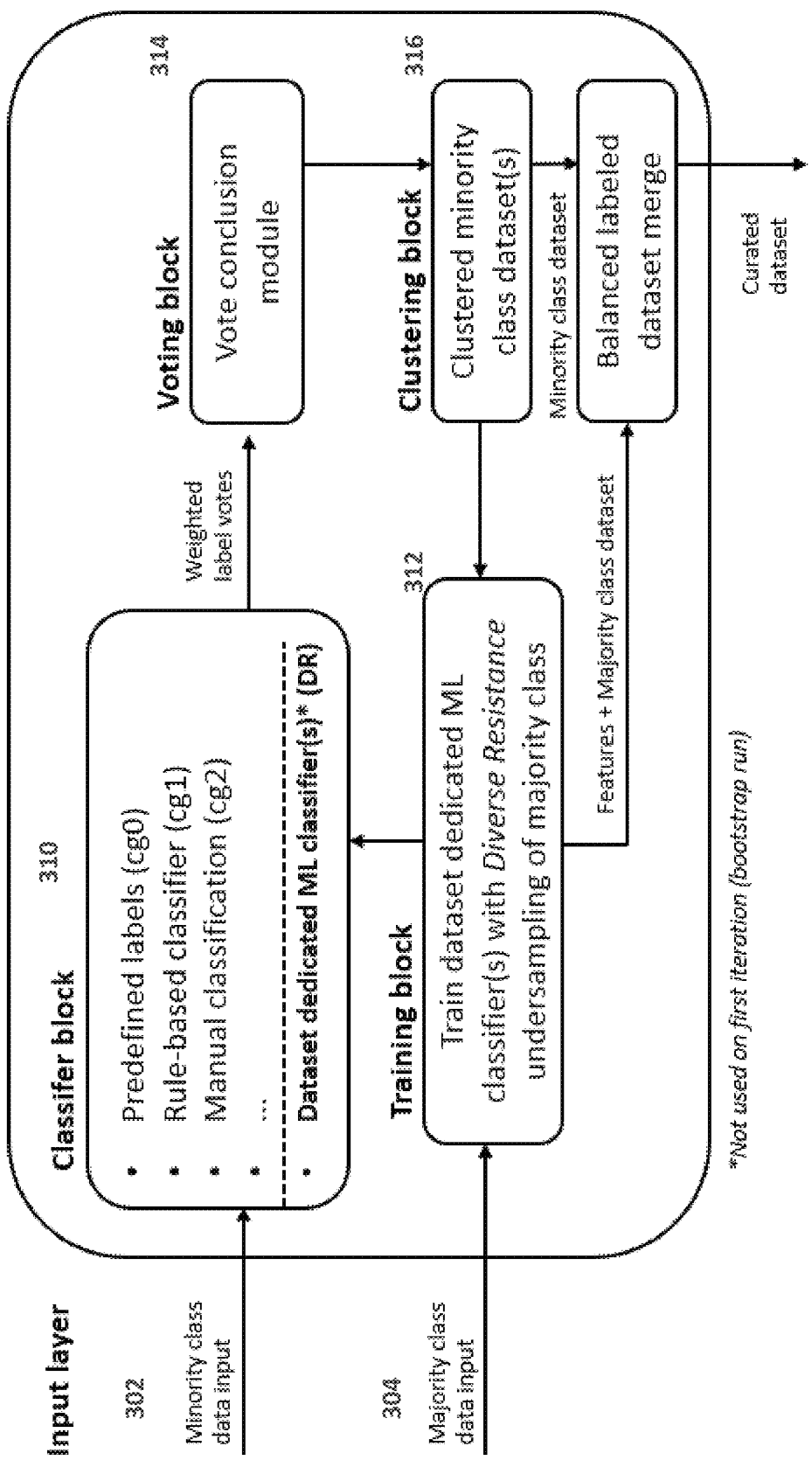
FIG. 4 illustrates details of the classifiers, model training, voting block and clustering processes of the label propagation element of the label propagation system being used for expanding a noisy unbalanced dataset into a curated balanced dataset.

The label propagation element 114 may further include a transformation layer 308, a classification layer 310 (comprising a set of classifiers), a training layer 312, a voting block/layer 314 and a clustering block 316 that are interconnected as shown in FIG. 3. FIG. 4 shown an alternative embodiment of the set of classifiers 310, the training block 312, the voting block 314 and the clustering block 316 which are described below.

In the transformation layer 308, the minority class samples may be transformed into a format which allows them to be labeled by any of the available classifiers in the Classifier block 310 so that the classifiers can properly interpret the data and cast votes. This format of the samples is domain specific and the system assumes that features can be extracted and made available to the classifiers. As shown in FIG. 3, the transformation may include a Suricata NIDS transformer 308A and a PCAP2 LOG converter 308B that transform the minority class dataset. As shown, the minority class samples may passed through the transformed 308A in the PCAP format into a network intrusion detection system (NIDS) alert classifier c0 whose operation is described below and may be converted to the known LOG format by the PCP2 LOG converter 308B that may be input into other classifiers (Killchain classifier c1 and SIEM classifier c2 in the example shown in FIG. 3).

The set of classifiers/classifier block 310 may have a plurality of classifiers that each receive the minority class dataset and each generate one or more label votes that are input to the voting block 314. As shown in FIG. 4, in one embodiment, the set of classifiers 310 may include a predefined label classifier cg0, a rule based classifier cg1, a manual classifier cg2, . . . , and a dataset (malware in one example) dedicated machine learning classifier DR. In a first iteration, the Classifier block 310 is responsible for bootstrapping the labeling process by making use of any classifier available. At least one classifier is necessary to bootstrap the labeling process, and as a last resort it may be a manual process (classifier cg2). Often a signature/rule based system can be used (classifier cg1) or the dataset is prelabeled which in this architecture is represented by classifier cg0.

In another embodiment shown in FIG. 3, the set of classifiers 310 may have three classifiers to bootstrap the label voting process including a NIDS alert classifier c0, a killchain classifier c1, a SIEM classifier c2 and a dataset ML classifier c3.1.

The NIDS classifier c0 receives the output (EVE JSON format) from the network-based intrusion detection system and maps the alerts to votes. Examples of the alert to label mappings performed by this classifier are shown in Table A1.2 below for the exemplary malware data embodiment.

Figure 5:
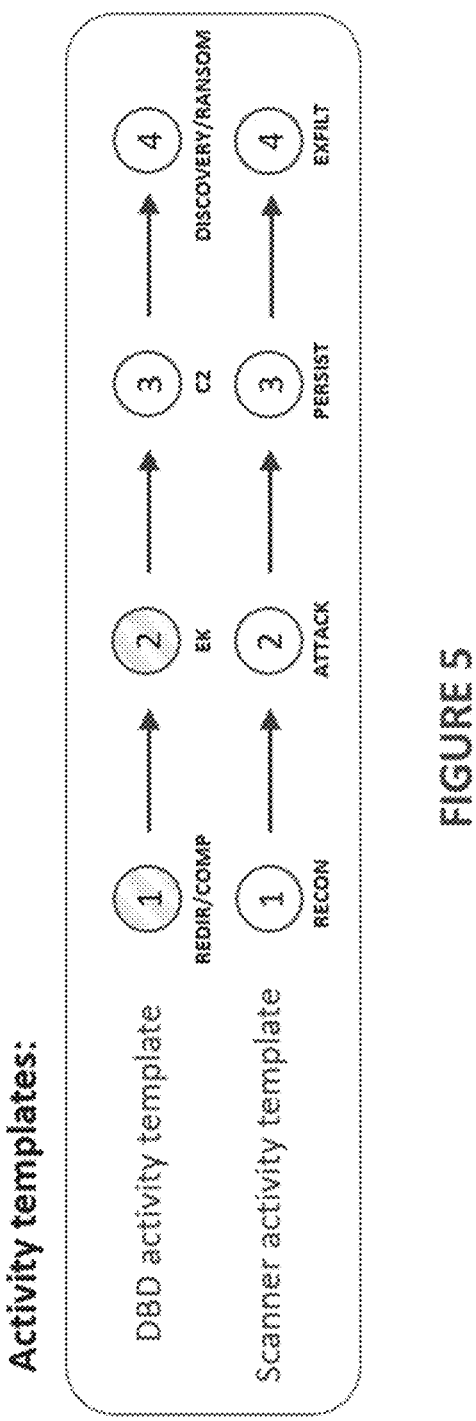
FIG. 5 illustrates an example of a killchain activity template that may be used by the killchain classifier.

Kill Chains article retrieved May 1, 2014 at www.lockheed-martin.com/content/dam/lockheed/data/corporate/documents/LM-White-Paper-Intel-Driven-Defense.pdf that is incorporated herein by reference. An example of the activity template rules implemented in the killchain classifier is shown in FIG. 5. These activity templates prevent labeling mistakes by making sure that the killchain sequence is sensible (such as preventing C&C activity from happening before a redirect to a malicious landing page).

An example vote from this classifier is shown in FIG. 11 where the "DBD Activity Template" adds a vote for the killchain state "EXPLOITATION_DELIVERY_CLIENT". This template is activated when a binary download is seen by a shared source which shortly after candidates for killchain states "COMPROMISED_SITE" and "DELIVERY" has been fulfilled.

The SIEM classifier c2 contains rules which generate alerts for specific malware families. These rules may be based on statistical properties and regular expressions. The rule engine that is part of the SIEM classifier may be implemented, for example, using a CEP engine called Esper (disclosed at github.com/espertechine/esper that is incorporated herein by reference). FIG. 6 is an example of a rule in the rule engine of the SIEM classifier for detecting RIG_EK variant. These rules mainly make use of temporal features, statistical properties and regular expressions to identify unique properties of the malicious behavior. This includes but is not limited to patterns for reconnaissance, exploitation, lateral movement and C&C activity.

Each of the classifiers, including the ML classifier c3.1 (described below in more detail) may generate one more votes for the labels as described above that may be fed into the voting block 314 as shown in FIGS. 3-4. The vote block

TABLE A1.2

Examples of NIDS alert to vote mappings for NIDS classifier c0

| Suricata alert | Label Vote |
| --- | --- |
| ET CURRENT_EVENTS DRIVEBY Nuclear EK SWF M2 | NUCLEAR_EK |
| ET CURRENT_EVENTS Nuclear EK IE Exploit Aug. 23, 2015 | |
| ET CURRENT_EVENTS Possible Nuclear EK Landing Nov. 17, 2015 | |
| ET CURRENT_EVENTS Possible Spartan/Nuclear EK Payload | |
| ETPRO CURRENT_EVENTS Possible Nuclear EK Landing Sep. 30, 2015 M1 | |
| ETPRO CURRENT_EVENTS Neutrino EK Payload Jul. 8. 2016 M1 | NEUTRINO_EK |
| ET CURRENT_EVENTS Job314/Neutrino Reboot EK Payload Nov. 20, 2014 | |
| ETPRO CURRENT_EVENTS Job314/Neutrino Reboot EK Landing Jul. 7, 2016 M1 | |
| ETPRO CURRENT_EVENTS Job314/Neutrino Reboot EK Landing Sep. 21, 2016 M1 | |
| ETPRO CURRENT_EVENTS Possible Job314/Neutrino Reboot EK Flash Exploit Jan. 7, 2015 M2 | |
| ETPRO CURRENT_EVENTS Angler EK Landing Jun. 11, 2015 M5 | ANGLER_EK |
| ETPRO CURRENT_EVENTS Angler EK Landing with URI Primer April 6 | |
| ET CURRENT_EVENTS Angler EK XTEA encrypted binary (23) | |
| ETPRO CURRENT_EVENTS Possible Angler EK Payload Jun. 16, 2015 M2 | |
| ET CURRENT_EVENTS Angler EK Feb. 4, 2015 M2 | |
| ET CURRENT_EVENTS Possible Magnitude IE EK Payload Nov. 8, 2013 | MAGNITUDE_EK |
| ET CURRENT_EVENTS Magnitude Flash Exploit (IE) | |
| ETPRO CURRENT_EVENTS DRIVEBY Magnitude Landing Dec. 3, 2014 | |
| ET CURRENT_EVENTS Magnitude Flash Exploit (IE) M2 | |
| ETPRO CURRENT_EVENTS DRIVEBY Magnitude IE Exploit Dec. 3, 2014 | |
| ETPRO CURRENT_EVENTS Fiesta EK IE Flash Exploit T1 | FIESTA_EK |
| ET CURRENT_EVENTS Fiesta SilverLight Exploit Download | |
| ET CURRENT_EVENTS Fiesta Java Exploit/Payload URI Struct | |
| ET CURRENT_EVENTS Fiesta EK Java Exploit Apr. 23, 2015 | |
| ET CURRENT_EVENTS Fiesta Flash Exploit URI Struct | |

The Killchain classifier c1 exploits typical sequence characteristics of Drive-by-Download (DBD) and Command-and-Control (C&C) scenarios when casting votes. More specifically it maps hosts and IP-addresses in the dataset to the cyber security killchain such as disclosed by the Lockheed Martin-Cyber Kill Chain, Campaigns and Intrusion processes the votes and generates collective classification and entity resolution to take place for each identified label. Initially the vote conclusion module treats all classifier votes of equal value where the weights are evenly distributed between the classifiers. These weights are adjusted for each iteration of the system as described below with reference to the training block 312. The vote conclusion module outputs the labeled samples to the Cluster process 316.

In some embodiments, the voting block 314 may wait until all classifiers have cast their votes before deciding on the final label. Initially the weight of each classifier is set to a fixed value and a majority vote is performed. When ties occur, the system will highlight the scenario to a domain export for resolution. All labels of the same kind are placed in the same dataset and sent to the clustering block 316.

Figure 12A:
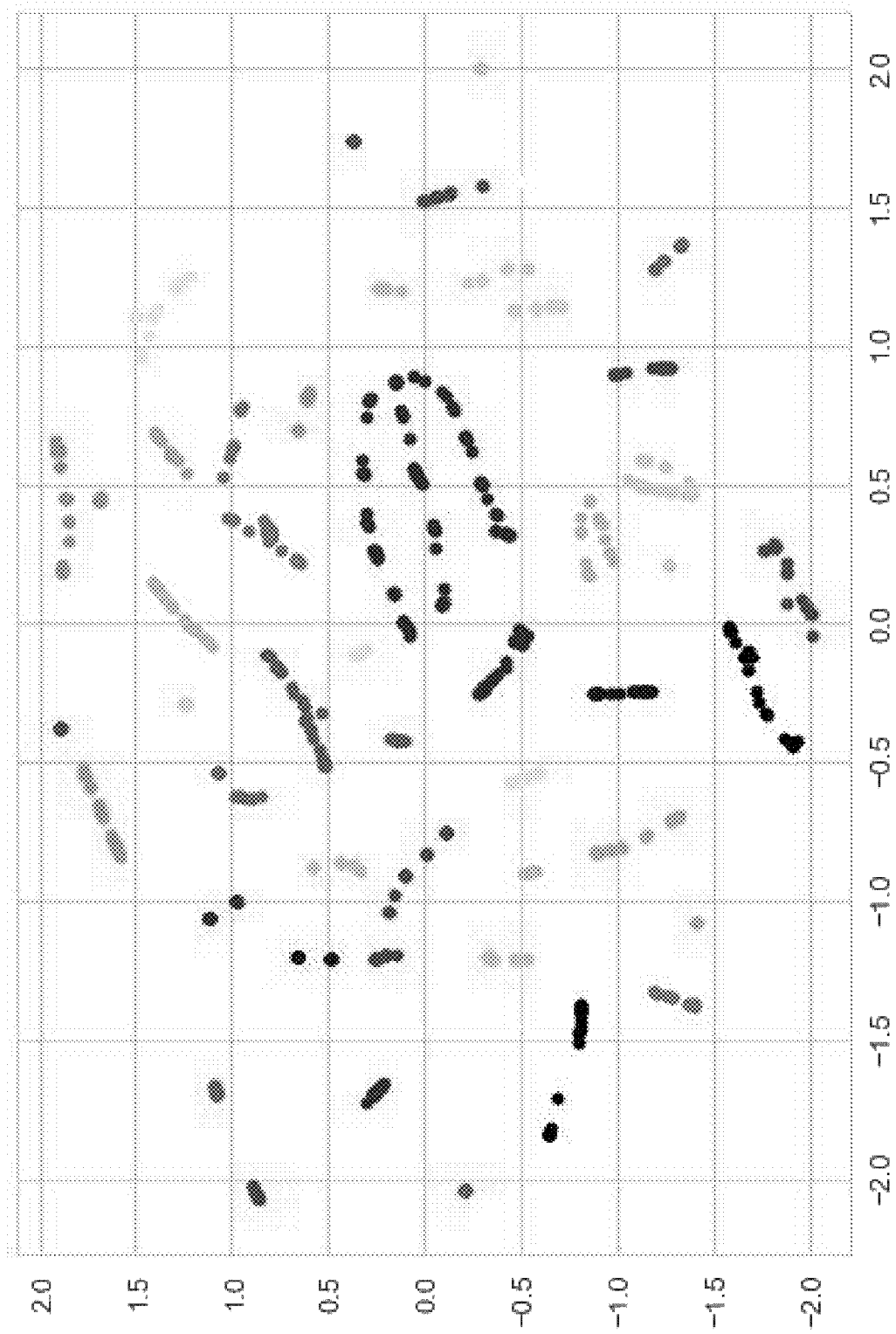
FIG. 12A illustrates an example of a DBSCAN clustering result for NEUTRINO_EK (URL structure features)

The cluster process 316 may cluster the samples into subgroups using unsupervised Machine Learning. The clustering algorithm used by this block needs to be able to determine the number of clusters on its own, and isolate outliers. For example the known DBSCAN method may be used that is described in the "A density-based algorithm for discovering clusters in large spatial databases with noise" article by Ester M, Kriegel H P, Sander J, Xu X. 1996. Di dalam: Simoudis E, editor. Proceedings of 2nd International Conference on Knowledge Discovery and Data Mining (KDD-96); 1996 Aug. 4-6. hlm 226-231 that is incorporated herein by reference. The clustering process groups the dataset into subsets based on the features and distance metric used. FIG. 12A shows the result from clustering NEUTRINO_EK URL structures using DBSCAN, where t-Distributed Stochastic Neighbor Embedding (t-SNE) is used as technique for reducing the dimensionality to 2. FIG. 12B illustrates an example of the NEUTRINO_EK URL cluster example.

In more detail, the clustering process 316 receives a labeled dataset from the voting block 314 and applies the clustering process. In one examples using DBSCAN for clustering, the parameters for DBSCAN (radius+minPts) and the distance metric is tuned to the domain (TCP/IP based network captures). The clustered datasets are then sent to the training block 312 as shown in FIG. 3.

The model training or training block 312 may perform a process of model training and the clustered datasets may be input to the training Block 312. The training block 312 may perform random undersampling of the majority class to balance the two classes of input data. The input data consists of Minority Dataset Dataset which consists of similar samples (belong to the same DBSCAN cluster) with a fixed label. Example input datasets:

RIG_EK_cluster0.json
NEUTRINO_EK_cluster3.json
FIESTA_EK_cluster0.json

Majority Dataset

Dataset of curated data from production which does not contain any samples which matches the minority class. This curation is made using public blacklists and reputation services.

The class imbalance is addressed by randomly undersampling the majority dataset to match the minority dataset. A subset of this merged dataset is used to train an initial RandomForest (described at A. Liaw and M. Wiener (2002). Classification and Regression by randomForest. R News 2(3), 18-22 that is incorporated herein by reference) Machine Learning classifier (named c3.0).

Figure 7:
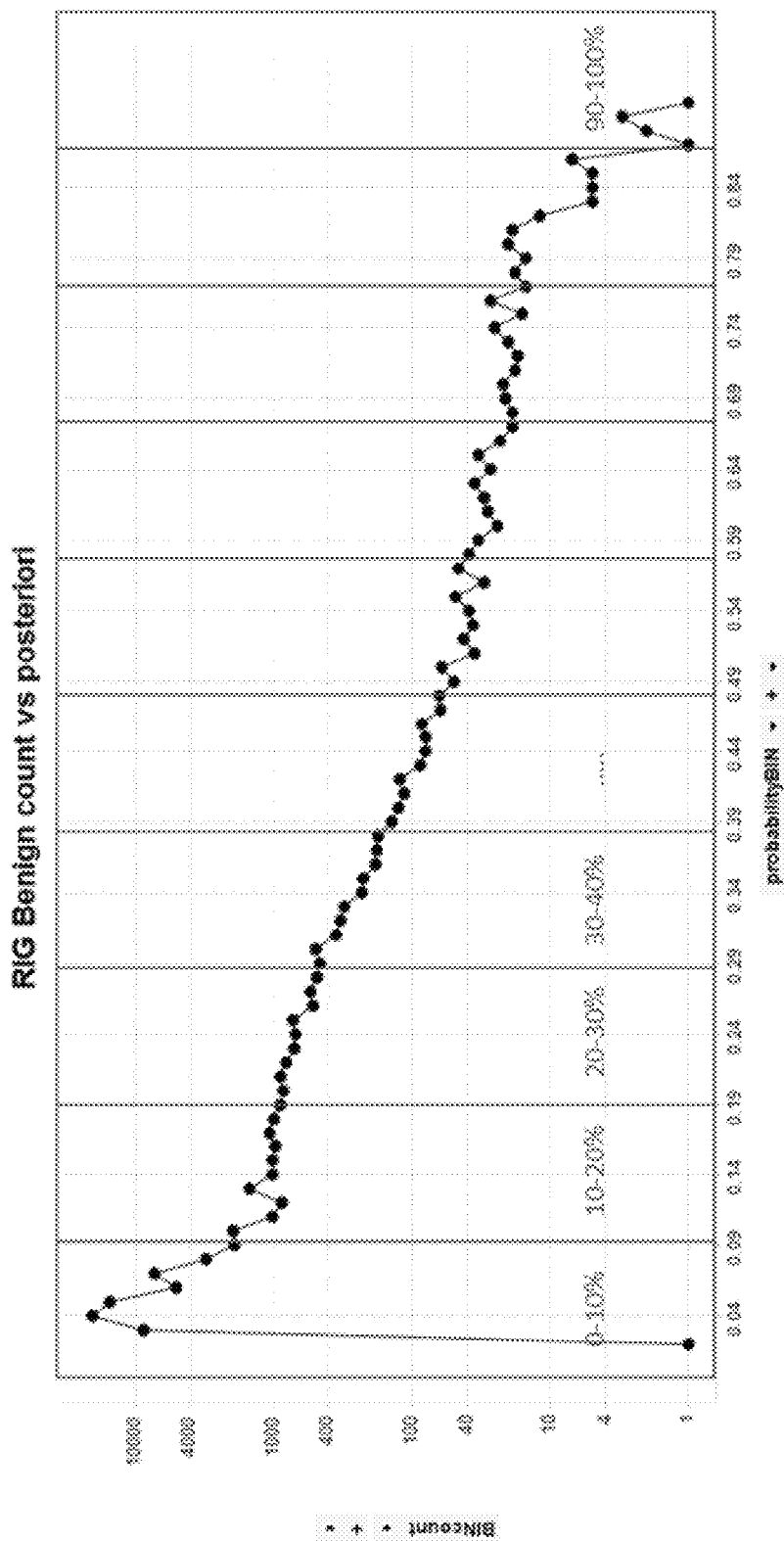
FIG. 7 illustrates an example of the RIG_EK classifier c3.0 being applied to the majority class.

This initial classifier is then applied to all entries in the Majority class and each sample is placed in bins based on the class confidence level of the classifier. A new balanced dataset is then created by undersampling evenly from the majority class using these bins. This method allows the Machine Learning classifier c3.1 to be created by maximizing the utilization ('resistance') of the majority class. An example is shown in FIG. 7 where the RIG_EK classifier c3.0 is applied to the majority class.

In this way the dedicated dataset classifier is exposed to a Diverse Resistance of majority class samples. We call the dedicated dataset classifier trained in this manner a DR-classifier as shown in FIG. 4. Once the Training block 312 has produced a DR-classifier it is inserted into the Classifier block 310 and the automated curation process has been established. The classifier c3.1 is then added as a member of the classifier block and participates in future iterations of the process. The vote weight of the classifier c3.1 can gradually be increased as the number of samples per cluster increases.

In one embodiment, the system may be implemented using the pseudocode in FIGS. 9A and 9B. The code may be Flink/Gelly code that uses a well known Scatter/Gather (also known as Signal/Collect) processing model for graphs, where additional information can be found here: ci.apache.org/projects/flink/flink-docs-release-1.3/dev/libs/gelly/iterative_graph_processing.html#scatter-gather-iterations that is incorporated herein by reference. So this Scatter/Gather approach, combined with the bipartite graph setup and weighted votes is what we use to determine the labels.

FIG. 8A illustrates the launch methods available to users of the system, where the curation process can be done with or without an active connection to the backend interface 104). The system also provides user identification to support scenarios where different users submit conflicting manual votes. In these cases a separate manual classifier will be launched for each user.

Figure 8B:
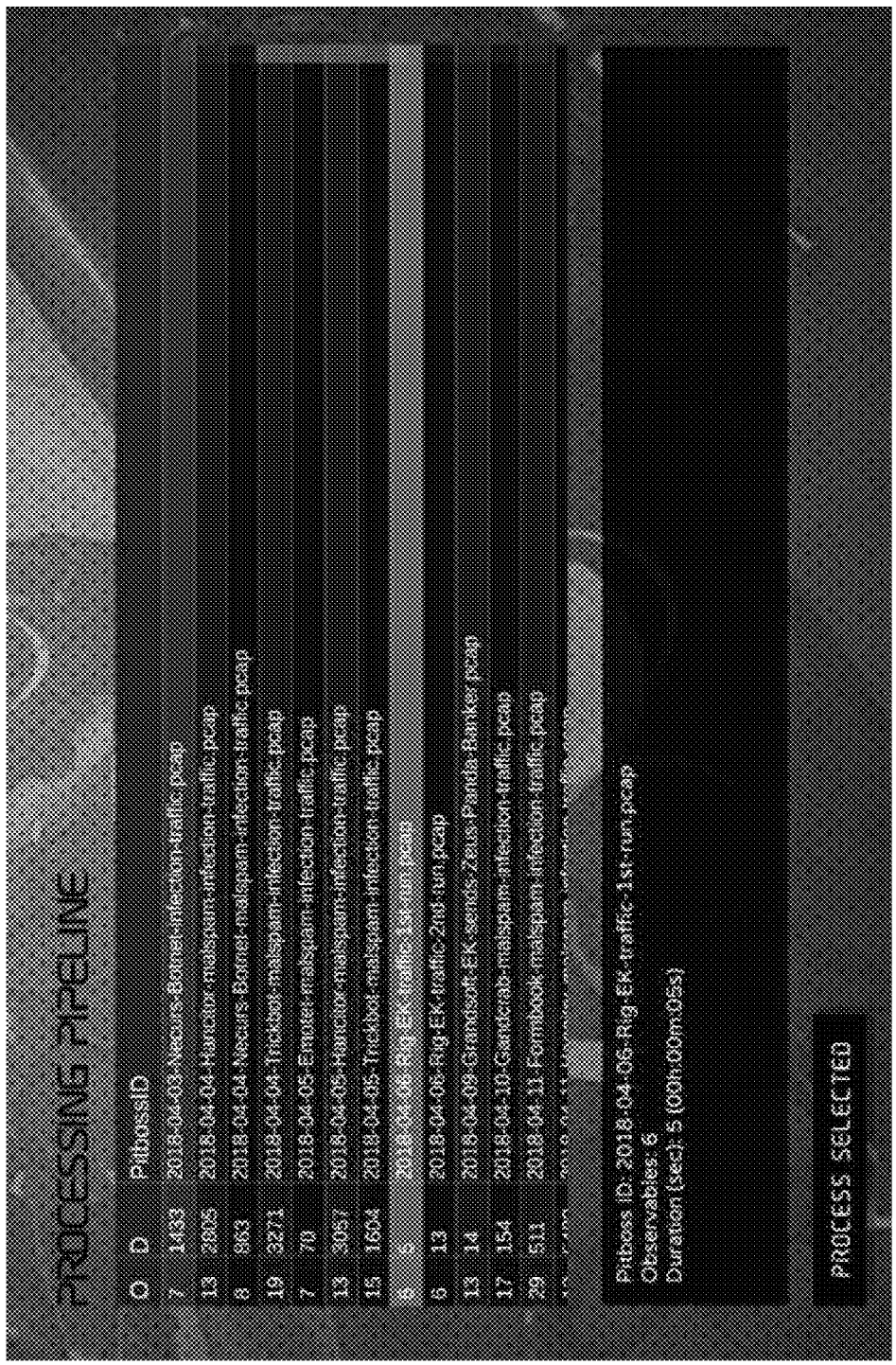

FIG. 8B illustrates the user interface for selecting a dataset to review, where the system (that includes a PitbossID element) is used as a unique dataset identifier throughout the system. The "D" column represents the duration of the dataset, and the "O" column the number of observables that can have labels in the dataset.

Figure 8C:

FIG. 8C illustrates the detailed view of the dataset, where the upper table shows all observables and the current label assigned to each observable. Selecting an observable in this table updates the mid-table named "Votes", which shows the weights/strength of each vote from each classifier. the bottom table shows the normalized dataset content for the selected observable, with optional settings to restrict the view to specific dataset types (Proxy, Firewall or DNS types).

Figure 8D:

FIG. 8D illustrates the same detailed view as in 8C, except that the automatic creation of the DR classifier ML3.1 has now been completed. This classifier is focused on identifying RIG_EK activity and has lowered the strength/weight of the other classifiers. As the dataset for this classifier grows the strength/weights of the other classifiers (NIDSc0, KCc1 and SIEMc2) will gradually weaken.

In one embodiment, the system may be utilized on the Iris dataset (https://en.wikipedia.org/wiki/Iris_flower_data_set), where the goal is to train a machine learning classifier to predict the species (*setosa, virginica* or *versicolor*) of the Iris flower based on 4 features: Petal Length, Petal Width, Sepal Length and Sepal width. This reference dataset is publicly available, correctly labeled and balanced (each class contains 50 samples with accurate measurements). In a real-life scenario the data collection process would likely encounter challenges such as finding 1000 samples of *setosa,* 500 *virginica* and 50 of *versicolor*). The data collections process also contained errors, where approximately 10% of the *setosa* and *virginica* species are mislabeled (*setosa* labeled as *virginica* and vice versa).

In this scenario the invention/system would allow for continuous collection of new samples and measurements, where 3 DR-classifiers would be created (*setosa* c3.1, *virginica* c4.1 and *versicolor* c5.1). Initially the curated dataset would consist of a balanced dataset of 150 entries where the clustering process has reduced the impact of the *setosa/virginica* mislabeling. As more measurements are obtained, the number of *versicolor* samples will determine how quickly the curated dataset can be expanded but the labeling process can be gradually handed over to the DR classifiers. The Diverse Resistance approach will ensure that the undersampled set of *setosa* and *virginica* samples in the curated dataset are chosen to maximize the class separation while still keeping the dataset balanced.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A method comprising:
   receiving a set of data for which one or more labels are identifiable, the set of data including majority class samples and minority class samples;
   performing a plurality of available classification processes on the minority class samples of the set of data to automatically identify, by each classification process, a label group in the minority class samples;
   voting, by each available classification process, to determine a selected label group for the minority class samples;
   clustering the selected group of minority class samples to generate a clustered minority dataset;
   generating a dedicated machine learning classifier using undersampling of the majority class samples and the clustered minority dataset;
   performing a plurality of classification processes including the plurality of available classification processes and the dedicated machine learning classifier on the minority class samples of the set of data to automatically identify, by each classification process, a second label group in the minority class samples, voting to determine a selected second label group of the minority class samples and clustering the selected second group of minority class samples to generate a second clustered minority dataset; and
   generating a curated labeled dataset, the curated labeled dataset including the second clustered minority dataset and the selected second label group.

2. The method of claim 1, wherein generating the dedicated machine learning classifier further comprises generating a diverse resistance classifier.

3. The method of claim 1, wherein the plurality of available classifiers further comprises a NIDS alert classifier, a killchain classifier and a SIEM classifier.

4. The method of claim 1, wherein voting to determine a selected label group further comprising assigning an equal weight to each of the plurality of available classifiers.

5. The method of claim 4 further comprising adjusting a weight of one or more of the available classifiers.

6. The method of claim 1 further comprising transforming the minority class samples into a format for each of the plurality of available classifiers.

7. The method of claim 1, wherein the data set further comprises malware data.

8. The method of claim 1, wherein clustering the selected group of minority class samples further comprises using a DB SCAN clustering method.

9. A system, comprising:
   a computer system having a processor, a memory and an interface that receives a set of data for which one or more labels are identifiable, the set of data including majority class samples and minority class samples;
   a first available classifier executed by the computer system that processes the minority class samples in the set of data to automatically identify a label group in the set of data;
   a second available classifier executed by the computer system that processes the minority class samples in the set of data to automatically identify a second label group in the set of data;

the computer system being further configured to:
- vote, by each available classification process, to determine a selected label group for the minority class samples;
- cluster the selected group of minority class samples to generate a clustered minority dataset;
- generate a dedicated machine learning classifier using undersampling of the majority class samples and the clustered minority dataset;
- perform a plurality of classification processes including the first and second available classification processes and the dedicated machine learning classifier on the minority class samples of the set of data to automatically identify, by each classification process, a second label group in the minority class samples, voting to determine a selected second label group of the minority class samples and clustering the selected second group of minority class samples to generate a second clustered minority dataset; and
- generate a curated labeled dataset, the curated labeled dataset including the second clustered minority dataset and the selected second label group.

10. The system of claim 9, wherein the dedicated machine learning classifier further comprises a diverse resistance classifier.

11. The system of claim 10, wherein the computer system is further configured to insert the diverse resistance classifier into the plurality of classification processes and iterate the performing of the plurality of classification processes on the minority class samples, the voting, by each classification process, to determine a selected label group for the minority class samples and the clustering the selected group of minority class samples to generate a clustered minority dataset to generate the curated data set.

12. The system of claim 9, wherein the first classifier is a NIDS alert classifier and the second classifier is a killchain classifier.

13. The system of claim 12 further comprising a SIEM classifier that processes the minority class samples in the set of data to automatically identify a label group in the set of data and votes on the selected label group.

14. The system of claim 13, wherein the computer system is further configured to assign an equal weight to each of the available classifiers.

15. The system of claim 14, wherein the computer system is further configured to adjust a weight of one or more of the available classifiers.

16. The system of claim 9, wherein the computer system is further configured to transform the minority class samples into a format for each of the available classifiers.

17. The system of claim 9, wherein the data set further comprises malware data.

18. The system of claim 9, wherein clustering the selected group of minority class samples further comprises using a DB SCAN clustering method.

19. A method comprising:
- receiving a set of data for which one or more labels are identifiable, the set of data including majority class samples and minority class samples;
- performing a bootstrap run using one or more available classifiers that generates a clustered minority dataset from the received minority class samples;
- generating a dedicated machine learning classifier using undersampling of the majority class samples and the clustered minority dataset;
- performing a plurality of classification processes including the one or more available classifiers and the dedicated machine learning classifier on the minority class samples of the set of data to automatically identify, by each classification process, a label group in the minority class samples;
- voting, by each classification process, to determine a selected label group for the minority class samples;
- clustering the selected group of minority class samples to generate a clustered minority dataset;
- generating a curated labeled dataset, the curated labeled dataset including the iterative clustered minority dataset and the selected iterative label group.

* * * * *